Patented Oct. 30, 1934

1,978,981

UNITED STATES PATENT OFFICE 1,978,981

METHOD OF PREPARING CAROTENE PIGMENT MATERIAL

Harold M. Barnett, Cleveland, Ohio, assignor to S. M. A. Corporation, Cleveland, Ohio, a corporation of Ohio No Drawing. Application April 12, 1932, Serial No. 604,877

7 Claims. (Cl. 260—167)

This invention relates to the preparation of a carotene pigment material, its object being to provide an improved and simple method which can be carried out at relatively low cost with the ability to recover a very large proportion, if not all, not only of the carotene material, but also of the reagents used in the process, and which method is satisfactory for use in connection with the recovery of the carotene from oily substances containing it.

A further object is to provide a simple and improved method of forming or recovering carotene iodide directly from carotene contained in other material, or, in other words, from a raw product in which the carotene is distributed throughout a relatively large mass of other material, such as palm oil or other natural product.

As will appear hereafter, the method accomplishes not only the formation or preparation of carotene iodide from such raw materials but it also contemplates the removal of the iodine from such carotene iodide, or, in other words, the breaking down of the carotene iodide molecule so as to take away its iodine. Such iodine separation leaves a substance which if not actually carotene is at least so closely similar thereto as to be, to all intents and purposes, substantially identical therewith. The carotene material thus formed may involve some slight modification or rearrangement as to its molecular structure, but it nevertheless is substantially identical with carotene in its coloring and pigment-like characteristics, as well as other characteristics. To avoid misunderstanding or any possible inaccuracy, I prefer hereinafter to characterize the product ultimately produced as "carotene pigment material" rather than "carotene". This designation is justified by the known existence of several forms of carotene; thus alpha-carotene, beta-carotene and iso-carotene have been described and the existence of other forms is suspected.

While from certain aspects the invention is adapted for use in the preparation or separation of carotene pigment material from any substance containing it, nevertheless it is more particularly adapted for the recovery of carotene pigment material from oily substances containing it, such as palm oil, which is known to contain an appreciable quantity of carotene, but from which the separation of carotene has not heretofore been commercially practicable.

According to my method the raw material containing the carotene, such as palm oil, is dissolved in a suitable solvent which is also a solvent for carotene and which, in case it is desirable to recover the oil practically unchanged, as with palm oil, should be a material which will not destroy or produce harmful effect upon the glycerides. For example, I have found that red palm oil, either crude or refined, may be dissolved in any one of a number of petroleum fractions, but the low boiling fractions are the more advantageous because more easily removed. Petroleum ether, with a boiling range of 30° to 50° C. is useful for the purpose. When the red palm oil is dissolved in petroleum ether the carotene which is present also dissolves and any natural or foreign insoluble substances which may be present may be readily removed by filtration, decantation or the like.

To the solution of palm oil in petroleum ether or other solvent I add a suitable reagent for precipitating the carotene and for this purpose iodine is a suitable precipitant. It is added in proper quantity and preferably in the form of a finely divided solid, such as finely ground iodine. The iodine dissolves in the petroleum ether palm oil solution and coincident with its solution carotene iodide is precipitated and may be removed by filtration, decantation, crystallization or the like. The peculiar feature of this is the fact that the iodine is not absorbed by the oily material, such as palm oil, as might be expected, but apparently directly combines with, attacks or is absorbed by the carotene, forming the iodide therewith. In this manner a more or less crude carotene iodide may be recovered in solid form, contaminated only by such palm oil or other fat or impurities as may be carried down with it. This more or less crude carotene iodide may be refined in any suitable manner, such as by dissolving the solid material in chloroform, reprecipitation with petroleum ether, crystallization, or other suitable steps, as will be readily understood.

The iodine is readily removed from the carotene iodide, either crude or refined, by the addition of suitable reagents which either absorb it or otherwise dispose of it. Such reagents, for example, may be sodium thiosulfate, mercury, ammonium hydroxide, alcoholic potash, sodium methylate, sodium ethylate, etc. The final product, after removal of the iodine, is the carotene pigment material before referred to, that is, a substance which is either carotene itself or a substance which very closely approximates it, differing if at all probably only in some slight modification or rearrangement of the molecular structure, but nevertheless having substantially the same color and pigment characteristics, as well as other characteristics of carotene.

One specific example of the practice of my method is as follows:

Two kilograms of red palm oil are dissolved in about 15 liters of petroleum ether. The solution is cleared by the removal of any solid residue, either undissolved material or solid foreign substances, by filtration or the like. To the resulting solution approximately 12 g. of finely ground iodine are added and the solution is agitated until all of the iodine dissolves. The carotene iodide begins to precipitate almost immediately, and after permitting the solution to stand for several hours the bulk of the supernatant liquid is decanted or siphoned off and the precipitated carotene iodide is separated from the remainder of the solution by filtration or any other suitable method. Depending upon the amount of fat and other impurities carried down with the iodide, and also upon the amount of carotene originally present in the palm oil, it is found that from 5 g. to 15 g. of crude carotene iodide may be obtained in this way. The crude carotene iodide may be refined by dissolving the solid material in chloroform and reprecipitating the iodide with petroleum ether, or, it may be treated directly with one of the reagents mentioned above, such as sodium thiosulfate, for the removal of the iodine and the recovery of the carotene pigment material.

About 90% of the solvents used may be recovered from the palm oil by distillation. Some free iodine may distill with the solvent, such as with the petroleum ether, but this in no way hinders use of the recovered solvent in subsequent treatments of further palm oil for the separation of carotene therefrom. The removal of the solvent further leaves a residue of crude palm oil which may be used for any other purposes, and if desired, the small amount of free iodine remaining in such recovered palm oil may be readily removed by shaking with sodium thiosulfate solution.

The quantity of petroleum ether or other solvent to palm oil may be varied within reasonable limits. Either too much or too little with respect to the palm oil may reduce the yield of carotene iodide, and if the ratio is too low the separation of the carotene iodide may also become more difficult.

The method described provides a very simple way of removing in concentrated form a very large proportion of the carotene present in palm oil or like oily substances containing it, with the possibility of also recovering a large proportion of the reagents employed in the process, such as petroleum ether or other petroleum fractions or other solvents, as well as the palm oil, and not only enables such carotene to be prepared as the iodide from a more or less crude material, but also provides for the preparation of the carotene pigment material from the iodide.

What I claim is:

1. The method of recovering carotene pigment substance from raw materials containing the same and consisting mainly of glycerides, comprising dissolving the material in a solvent therefor and precipitating carotene iodide therefrom.

2. The method of separating carotene pigment material from naturally occurring glycerides containing the same, consisting in dissolving the glycerides in a solvent and precipitating carotene iodide therefrom.

3. The method of separating carotene pigment material from palm oil by dissolving the oil in a solvent, adding iodine thereto and collecting the resulting precipitate.

4. The method of separating carotene pigment material from oily materials consisting mainly of glycerides, consisting in dissolving the material in a solvent, precipitating and collecting carotene iodide, and removing the iodine therefrom by treatment with a reagent for iodine.

5. The method of recovering carotene pigment material from naturally occurring glycerides containing it, consisting in converting the carotene to carotene iodide, separating the latter, and splitting off the iodine therefrom by treatment with a reagent for iodine.

6. The method of preparing carotene pigment material from palm oil, consisting in dissolving the palm oil in a solvent, adding free iodine containing material thereto, thus precipitating the carotene as an iodide, and recovering the carotene pigment material from the iodide by treatment with a reagent for iodine.

7. The method of preparing carotene pigment material from palm oil, consisting in dissolving the palm oil in a solvent, adding solid iodine to the solution, separating the precipitated carotene iodide, and treating the latter with sodium thiosulfate to recover a carotene pigment material.

HAROLD M. BARNETT.